UNITED STATES PATENT OFFICE.

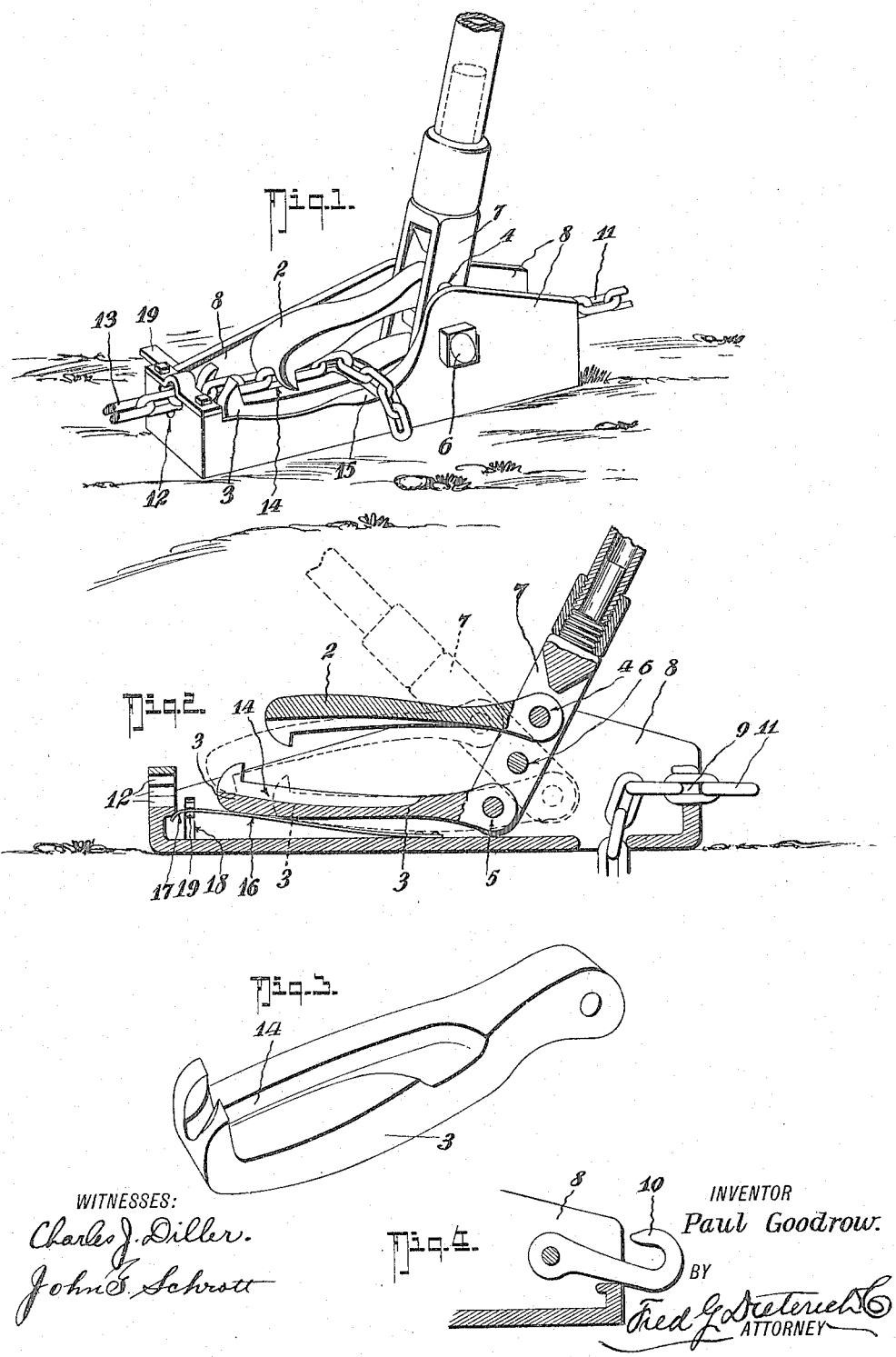

PAUL GOODROW, OF VANCOUVER, BRITISH COLUMBIA, CANADA.

CHAIN-PULLING JACK.

1,128,772.

Specification of Letters Patent.

Patented Feb. 16, 1915.

Application filed May 28, 1914. Serial No. 841,497.

*To all whom it may concern:*

Be it known that I, PAUL GOODROW, a citizen of the Dominion of Canada, residing at Vancouver, in the Province of British Columbia, Canada, have invented certain new and useful Improvements in Chain Pulling-Jacks, of which the following is a specification.

This invention relates to a chain pulling device which has been particularly designed for application as a stump puller or the like.

It comprises the application of the well known chain pulling dogs pivotally mounted on each side of the fulcrum of a lever, which fulcrum is connected to the anchoring means.

The device has been devised to provide a simple and compact chain pulling device that can be conveniently carried from place to place and used where an extra heavy haul is required to extract a stump.

The invention is particularly described in the following specification, reference being made to the drawings by which it is accompanied, in which:

Figure 1 is a perspective view of the device complete, showing its application between the hauling chain and an anchoring chain. Fig. 2 is a longitudinal section of the same. Fig. 3 is an enlarged detail in perspective of the lower chain holding dog, and Fig. 4 is a modified attachment for the anchoring means, adapted for use where a wire rope is used for anchoring the haul.

In these drawings 2 and 3 represent the upper and lower chain engaging dogs which are designed to engage the ends of the horizontally disposed links of the chain outside of each vertically disposed connecting link, and are pivotally connected at 4 and 5 to the same side of the lever 7 by which the power is applied. This lever 7 is fulcrumed at 6 to a trough-shaped frame 8 by an ordinary bolt and nut through its sides, and is connected at the back end to the anchoring means 11, either by a chain retaining provision 9, as shown in Fig. 2, or, as shown in Fig. 4, by a hook 10 pivoted on a bolt through the sides of the frame 8, to which hook, connection may be made in any suitable manner.

The hauling chain 13 is led through a groove 12 in the other end of the frame 8, which groove may have a keeper over it, and passes along the forward end of the lower dog 3 which is grooved, as at 14, to receive it. This groove or channel 14 is laterally diverted adjacent to the pin connection 5 of the dog to the lever 7, to deliver the chain 13 over the side of the frame 8 which side is removed, as at 15, to facilitate such delivery. A spring 16 is secured to the underside of the frame 8 and its free end is checked, as at 17, against movement above the bottom of the groove 12. This spring holds the lower dog 3 in engagement with the chain 13, to release it from which engagement, when desired, a treadle 19 is secured to the free end of the spring and projects through a slotted aperture 18 in the side of the frame 8.

In use, the frame 8 of the device is connected to its anchorage and the hauling chain 13 is placed in the groove 12 of the frame and of the lower dog 3. This spring 16 holds the lower dog 3 up against the chain 13 while the weight of the upper dog 2 performs the same service for it. The ends of both dogs are so shaped that they will move freely forward over the links of the chain but will effect a secure hold of the end of a horizontally disposed link on each side of each vertically disposed connecting link. As the lever 7 is moved forward the lower dog 3 secures a hold of the chain and draws it back, while the upper dog 2 moves forward over the links. On reversal of the movement of the lever 7 the upper dog secures a hold and draws in the chain while the lower dog moves forward for a fresh hold, the chain in both instances being laterally diverted over the side of the lower dog and of the frame 2 at 15. The hauling chain is thus gradually shortened with a powerful leverage. When it is required to release the chain the spring is pressed down by application of the foot to the treadle 19 and the dogs may be disengaged from their hold of the chain.

The chain is simple and inexpensive and being small in bulk and of trifling weight is conveniently portable for use in land clearing operations for which it has been particularly designed.

Having now particularly described my invention, I hereby declare that what I claim as new and desire to be protected in by Letters Patent, is:

1. A chain pulling jack, comprising a lever having at one end two chain engaging dogs pivotally connected to it adjacent to one another the ends of said dogs being shaped to engage the ends of a chain link on each side of the connecting link, the lower dog being grooved to divert the chain laterally adjacent to its connection to the lever, an elongated trough-like frame between the sides of which the lever is mounted on a pivot between the two dog connections, said frame having means at one end to retain an anchorage connection, and a groove at the other end of the frame to deliver the chain on to the groove of the lower dog and the sides of the frame being removed opposite the lateral delivery of the chain groove of the lower dog throughout its movement.

2. A chain pulling jack, comprising a lever having two chain engaging dogs pivotally connected to it adjacent to one another at one end the lower dog being grooved within its engaging end to divert the chain laterally, an elongated trough-like frame between the sides of which the lever is mounted on a pivot between the two dog connections, said frame having at one end means to retain an anchoring connection and at the other end a groove to deliver the chain on to the groove of the lower dog and the side of the frame being depressed opposite the lateral delivery of the lower dog through its movement, and a spring sustaining the lower dog at the approximate level of the chain delivery.

3. A chain pulling jack, comprising a lever having two chain engaging dogs pivotally connected to it adjacent to one another at one end the lower dog being grooved within its engaging end to divert the chain laterally, an elongated trough-like frame between the sides of which the lever is mounted on a pivot between the two dog connections said frame having at one end means to retain an anchoring connection and to the other end a groove to deliver the chain on to the groove of the lower dog and the side of the frame being depressed opposite the lateral delivery of the lower dog through its movement, a spring sustaining the lower dog at the approximate level of the chain delivery, and means projecting through the sides of the frame for releasing this spring from engagement with the dog.

In testimony whereof I affix my signature in presence of two witnesses.

PAUL GOODROW.

Witnesses:
 ROWLAND BRITTAIN,
 MAY WHYTE.

Copies of this patent may be obtained for five cents each, by addressing the "Commissioner of Patents, Washington, D. C."